UNITED STATES PATENT OFFICE.

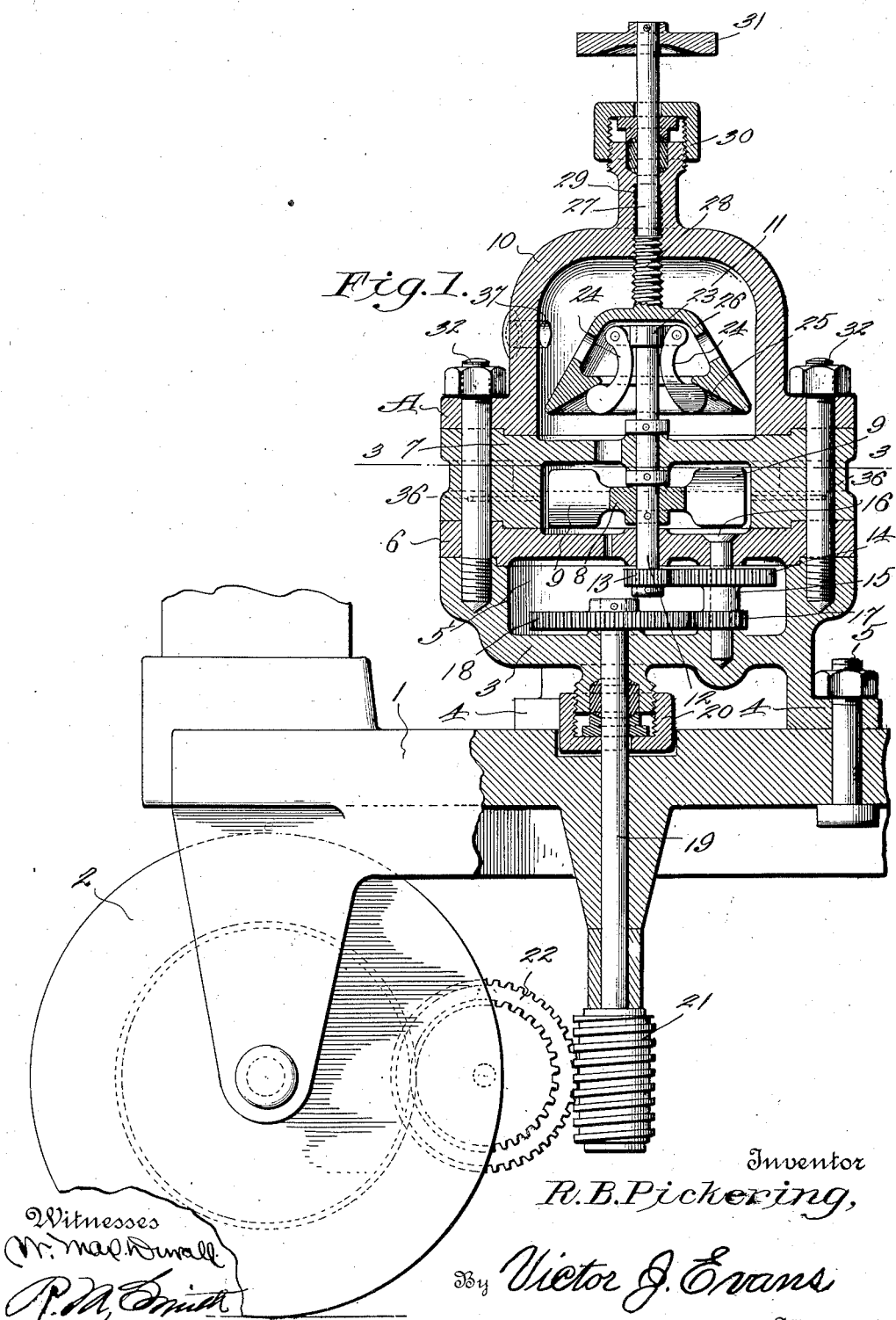

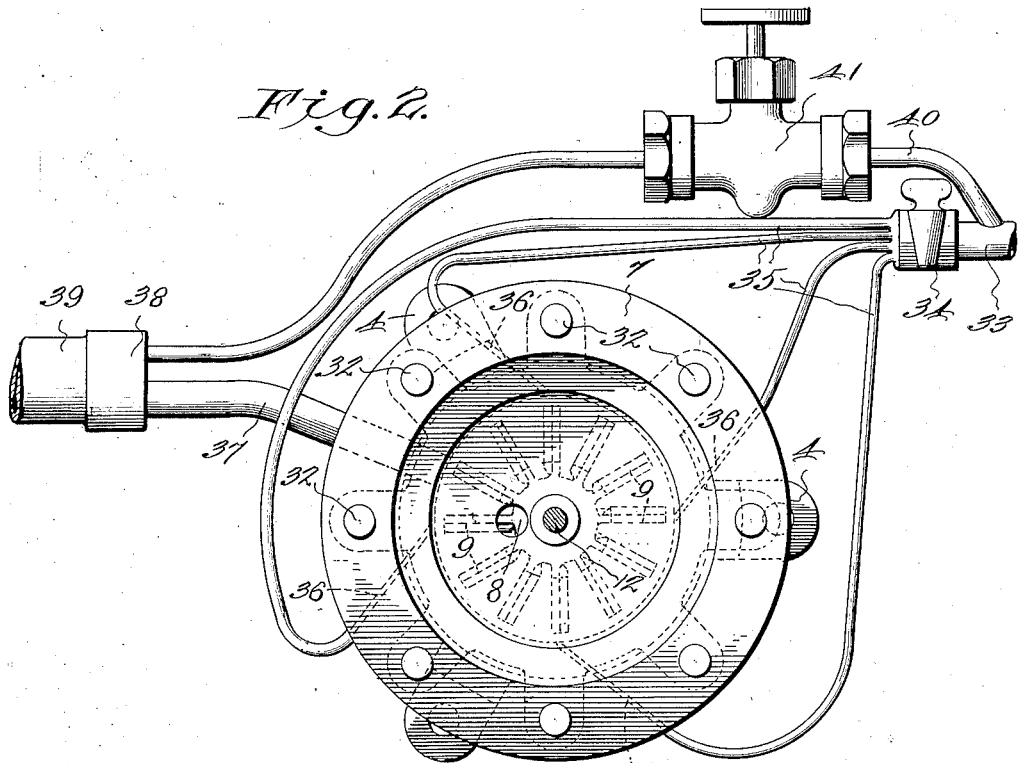
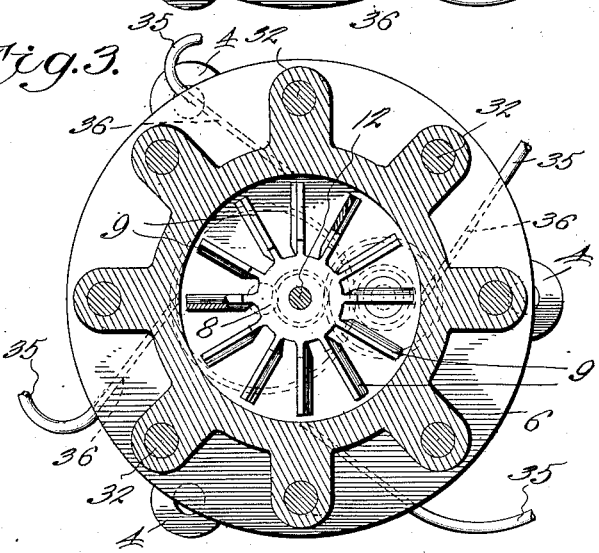

RAYMOND B. PICKERING, OF ALAMEDA, CALIFORNIA.

BLOWPIPE APPARATUS.

1,379,360. Specification of Letters Patent. Patented May 24, 1921.

Application filed October 12, 1917, Serial No. 196,213. Renewed February 14, 1921. Serial No. 445,011.

*To all whom it may concern:*

Be it known that I, RAYMOND B. PICKERING, a citizen of the United States, residing at Alameda, in the county of Alameda and State of California, have invented new and useful Improvements in Blowpipe Apparatuses, of which the following is a specification.

This invention relates to blowpipe apparatus or apparatus for severing or cutting metals by fusion.

One of the main objects of the present invention is to utilize in a practical and reliable manner the kinetic energy of the gas such as oxygen or acetylene for driving the carriage by means of which the blowpipe is fed along a predetermined path while making a cut or severing the metal along a predetermined line.

It has heretofore been customary to use an electric motor for driving the carriage of the apparatus when used either for cutting or welding purposes. Considerable trouble and loss of time has been experienced with the use of electric motors on account of chips, sparks, dust, dirt and grit getting into the motor, offering resistance and frequently causing a short circuit. It is often necessary to perform cutting and welding operations at times when there is no electric energy available, resort being had to a storage battery in such case. Such battery is however heavy and cumbersome and it is often found easier to perform the work by hand which is slow and tedious and often results in a rough cut as compared with a machine cut. In many parts of the country where oxy-acetylene welding and cutting are done, there is no electric current obtainable either to drive the carriage or recharge a storage battery; in such a case an electric motor driven machine is useless.

I use a portable storage tank for the gas, holding two hundred cubic feet of gas at a pressure of two hundred and fifty pounds to the square inch. In conjunction with such storage tank, I have designed a motor constructed in such manner as to run at any desired speed by using the kinetic energy of such gas under pressure. This gas is used on its way from the storage tank to the cutting torch but it must be reduced to a pressure of from forty to sixty pounds per square inch by means of a reducing valve. The motor is connected in the gas line between the reducing valve and the cutting and welding torch. In using the gas for energy, the pressure is automatically reduced thereby assisting the reducing valve in its work and making the flow of gas to the torch more uniform, which is an essential feature to good work.

In starting a cut, it is necessary to adjust the heating flame preparatory to starting the motor and before the main jet of gas is started; therefore I have arranged a bypass in the gas line to render this practicable, the bypass being used to advantage to increase or decrease the speed of the motor by increasing or decreasing the flow through the motor. This enables the speed of the cutting operation to be regulated. In addition to the regulating or governing means above referred to, I also employ a friction brake or governor which may be adjusted to produce the necessary predetermined speed of the motor and carriage.

Another important result is accomplished, as follows, it requires a certain amount of pressure to cut a certain thickness of steel at a given speed. If that speed is retained after the pressure is reduced slightly, by the reducing valve not working properly, which frequently happens, the cutting machine travels too rapidly for the pressure of gas, resulting in a ragged edge being left on the work, permitting the slag to adhere to the plate instead of carrying the slag clear of the cut. If the pressure is too greatly reduced the cut will not extend all the way through the plate. On this account, when an electric motor is being used, the operator must be ever on the alert. With the improved apparatus, any reduction in pressure will affect the motor as well as the cutting torch and both will slow down together proportionately, resulting in a smooth cut and the blowing of the slag clear of the cut.

With the above and other objects in view, the invention consists in the novel construction, combination and arrangement of parts, herein described, illustrated and claimed.

In the accompanying drawings:—

Figure 1 is a vertical longitudinal section through the improved apparatus.

Fig. 2 is a plan view of the same illustrating certain features by dotted lines.

Fig. 3 is a section on the line 3—3 of Fig. 1.

Referring to the drawings 1 designates a truck or carriage frame mounted upon carrying wheels 2, one or more of said wheels constituting driving or traction wheels.

Mounted upon the frame 1 of the carriage is a motor designated generally at A and comprising a casing of sectional formation, 3 designating the base section of the casing which is formed with one or more supports or flanges 4 secured by fastening means 5 to the carriage. The lower section of the casing is recessed to provide a gear chamber 5' the upper part of which is closed by a cover section 6. Superimposed upon the cover section 6 is a rotor casing section 7 in which operates a rotor 8 having blades 9 radiating therefrom and curved or dished in cross section. Superimposed upon the section 7 is a cap section 10 of hollow formation providing a governor chamber 11.

The rotor 8 is fast upon a rotor shaft 12 journaled in bearings and extending vertically and centrally through the rotor casing. Fast on the lower extremity of the shaft 12 is a gear 13 which meshes with and drives another gear 14 fast on a sleeve 15 journaled on a countershaft 16. Connected with the same sleeve 15 is another gear 17 which meshes with and drives a gear 18 on a downwardly extending carriage driving shaft 19. The reduction gear just described, provides for a relatively slow rotation of the shaft 19 and the latter passes through a stuffing box 20 at the bottom of the casing of the motor. The shaft 19 is connected by worm gears 21 and 22 to one or more of the driving or traction wheels 2 hereinabove referred to.

Pivotally connected to a cross head 23 on the upper end of the rotor shaft 12 are centrifugal friction arms or shoes 24 which are adapted to contact with the internal beveled friction face 25 of a frusto-conical governor or brake member 26 which is fast on the lower end of an adjusting or regulating stem 27 having a threaded portion 28 which extends through and engages an internally threaded extension 29 of the section 10 of the casing A. The upper smooth portion of the stem 27 passes through a stuffing box 30 and above the latter, a suitable operating hand grip 31 is fast on the stem 27. By raising and lowering the member 26, the friction shoes 24 are given greater or less swinging movement thereby serving to regulate the speed of the motor and prevent the same from accelerating to too great an extent. Several sections of the casing A are secured together by fastening means 32.

33 represents the compressed gas supply pipe which extends from a storage tank (not shown). The pipe 33 contains a flow regulating and pressure reducing valve 34 from the casing of which lead off relatively small branch pipes 35 which communicate with obliquely disposed intake passage 36 which discharge into the rotor chamber as indicated by dotted lines in Figs. 1 and 2 and direct the gas under pressure against the concaved sides of the wings 9 of the rotor 8. The action of the gas under pressure against the wings of the rotor tends to centralize the rotor and do away with the necessity of employing end thrust bearings for the rotor shaft 12, while reducing friction to a minimum. An exhaust pipe 37 leads off from the rotor chamber at a suitable point and is of sufficient capacity to take care of the outflow of gas under pressure from the rotor chamber. The pipe 37 is connected by coupling means 38 to the blow torch a portion of which is indicated at 39. A branch pipe 40 extends from the supply pipe 33 directly to the torch 39 and contains a regulating and cut off valve 41 by means of which the flow of gas and the ultimate pressure thereof may be regulated.

From the foregoing description taken in connection with the accompanying drawings it will now be seen that by interposing the motor between the compressed gas supply and the torch, and by bypassing a portion of the gas around the motor, a part of the gas is used for propelling the motor and such part may be regulated as to pressure by means of the valve 34. Another part of the gas passes through the bypass 40 and the flow and pressure thereof are regulated by the valve 41. When the pressure is reduced for the torch, it is correspondingly and proportionately reduced for the motor thus causing the motor to propel the carriage at slower speed. This insures a good cut free from slag and requires very little attention on the part of the operator as compared with machines propelled by electric motors where there is no means for automatically governing the ratio between the pressure in the torch and the speed of travel of the carriage.

I claim:—

1. In blowpipe apparatus of the class described, the combination of a carriage, a torch supported thereby, a supply of gas under pressure, a casing on the carriage provided with three chambers, a shaft journaled in the casing and passing through the center chamber with its end projecting into the upper and lower chambers, blades carried by the shaft and located between the center chamber, governor means located in the upper chamber and connected with the upper end of the shaft, a pinion on the lower end of the shaft within the lower chamber, a driven shaft extending through the lower part of the casing and having its upper end located in the lower chamber, gearing within said lower chamber connecting said shaft with the the pinion, means for connecting said shaft with the drive wheel of the carriage and means for directing some of the gas on its way to the nozzle against the blades in the center chamber.

2. A blowpipe apparatus of the class described comprising a carriage, a nozzle carried thereby, means for supplying gas to said nozzle, a casing located on the carriage provided with three chambers, a rotor in the center chamber, gearing in the lower chamber connected with the rotor, means for connecting said gearing with the drive wheel of the carriage, governor means in the upper chamber and connected with the rotor, a plurality of nozzles in said casing for directing the gases against the rotor, said nozzles being arranged to cause the gases to drive the rotor in one direction, a plurality of pipes connecting said nozzles with the gas supply and a pipe connected with the governor chamber and the nozzle for leading the gases from the rotor to said nozzle.

In testimony whereof I affix my signature.

RAYMOND B. PICKERING.